United States Patent [19]

Schuon

[11] 3,828,255

[45] Aug. 6, 1974

[54] ELECTRIC METER WITH LOGARITHMICALLY INDICATING DIGITAL READER

[75] Inventor: Eberhard Schuon, Eningen, Germany

[73] Assignee: Wandel u. Goltermann, Reutlingen, Germany

[22] Filed: Aug. 7, 1972

[21] Appl. No.: 278,640

[30] Foreign Application Priority Data

Aug. 5, 1971 Germany .......................... 2139126

[52] U.S. Cl. ................ 324/132, 324/99 D, 328/145

[51] Int. Cl. ........................ G01r 15/10, G01r 17/06

[58] Field of Search .......... 324/132, 99 D; 328/143, 328/144, 145

[56] References Cited

UNITED STATES PATENTS

| | | | |
|---|---|---|---|
| 3,283,254 | 11/1966 | Haynie | 328/143 |
| 3,543,152 | 11/1970 | Niedereder | 324/99 D |
| 3,644,837 | 2/1972 | Clark | 328/143 |
| 3,716,849 | 2/1973 | Metcalf | 324/99 D |

*Primary Examiner*—Alfred E. Smith
*Assistant Examiner*—Ernest F. Karlsen
*Attorney, Agent, or Firm*—Karl F. Ross; Herbert Dubno

[57] ABSTRACT

A variable voltage to be logarithmically indicated is fed to an input of an operational amplifier acting as a constant-current source in charging or discharging a capacitor at a constant rate determined by the magnitude of that voltage. The time required for the capacitor to charge or discharge from a reference potential to a potential equal or proportional to the variable voltage (or vice versa) is measured by a digital counter to which the output of a constant-frequency pulse generator is supplied, during the charging or discharging interval, through a binary frequency divider with a multiplicity of cascaded binary stages which are progressively cut in or out by a programmer responding to a predetermined number of pulses in the divider output, thereby modifying the pulse rate in the divider output in discrete steps by a factor of 2. Intermediate steps, designed to provide a closer approach to a logarithmic function, involve the alternate insertion of two final stages of stepdown ratio 5:1 and 7:1 in cascade with the binary stages to establish a pulse-rate modification by a factor of approximately $\sqrt{2}$.

10 Claims, 7 Drawing Figures

ELECTRIC METER WITH LOGARITHMICALLY INDICATING DIGITAL READER

SPECIFICATION

My present invention relates to a system for logarithmically indicating an analog value expressed by an electrical variable, especially a voltage, in the form of digital readings.

Such logarithmic indications are useful inasmuch as they are readily translatable into decibel readings of electrical energy.

A conventional way of obtaining logarithmic digital readings of a variable voltage is to generate an exponentially decreasing charging or discharging current for a capacitor whose initial or terminal charge is proportional to the analog value to be measured; a pulse train of constant cadence, produced during the charging or discharging interval, then yields a pulse count proportional to the logarithm of that analog value. Although such a system is theoretically satisfactory, its results are not always accurate because the logarithmic increment of charge depends on the time constant of the circuit which includes the capacitor and is therefore affected by impedance changes due to ambient conditions such as heat and moisture. Owing to the nature of the exponential functions, these variations manifest themselves as significant departures from a true reading.

The general object of my present invention, therefore, is to provide an improved system of this character which does not rely upon an exponential charge or discharge but uses only linear variations of a measuring parameter, specifically a capacitor charge, to provide the desired logarithmic readings.

A system embodying my invention comprises a reversible constant-current source, advantageously designed as an operational amplifier, for alternately charging and discharging a capacitor with a current flow whose magnitude and direction are controlled by an input circuit whereby this capacitor can be alternately charged and discharged at selected, not necessarily identical, constant rates. The capacitor works into a voltage comparator having a reference input for establishing a level of comparison with the capacitor charge; this reference input is connected to one of three terminals carrying different voltages, the other two of these terminals being alternately switchable to the input circuit of the constant-current source (specifically to an inverting input of the aforementioned operational amplifier) to establish a charging interval and a discharging interval for the capacitor. Two of these terminal voltages are fixed while the third is the variable voltage $V_m$ representing the analog value to be measured; the end of a measuring period proportional to voltage $V_m$ is marked by an output signal from the comparator as soon as the capacitor charge matches the comparison level. Thus, the capacitor may be initially charged to a fixed level, by applying an invariable reference voltage to the inverting amplifier input for a predetermined length of time, and may thereafter be discharged to the level of the variable voltage $V_m$ applied to the reference input of the comparator; it is also possible, however, to vary the charging rate in accordance with the magnitude of voltage $V_m$, by applying the latter to the inverting amplifier input during the charging interval, and to discharge the capacitor to a fixed voltage level (preferably ground) applied to the comparator. In the first case the length of the measuring period is determined by the instantaneous value of voltage $V_m$ upon the signaling of a match by the comparator; in the second instance the capacitor potential at the beginning of the discharge will depend upon the mean of the voltage $V_m$ during the charging interval, it being assumed that this voltage changes but little during the relatively short charging and discharging intervals. A generator of constant-cadence pulses is enabled, during the measuring period, by a timer which also controls the switchover from charging to discharging. The pulses from this generator are delivered to a counter by way of an adjustable frequency-dividing network adapted to step down the original cadence to a variable pulse rate in the counter input. A programmer, responsive to a predetermined pulse count in the output of the frequency-dividing network, progressively modifies this step-down ratio by a substantially constant factor $2^{1/n}$, $n$ being a finite integer (i.e., a whole number other than zero) preferably equal to 2. The modification of the pulse rate by the programmer during a measuring period occurs in a number of incremental or decremental steps sufficient to approximate a logarithmic relationship between the magnitude of voltage $V_m$ and the total number of pulses counted during that period.

According to a more specific feature of my invention, the frequency-dividing network comprises a plurality of cascaded binary stages which may be individually short-circuited by respective bypass switches under the control of the programmer. The short-circuiting of any stage multiplies the pulse rate in the divider output by a factor of 2 so that $n = 1$ if the network consists entirely of binary dividers. Higher values of $n$ result in a better approximation of the logarithmic function; with $n = 2$, it becomes necessary to introduce intermediate switching steps between reversals of the several bypass switches in order to provide a factor of approximately $2^{1/2} = \sqrt{2}$; since the ratio $\sqrt{2} : 1$ equals roughly 7 : 5, this incremental or decremental factor can be obtained with good approximation by the alternate connection of two final dividers of respective step-down ratios 7 : 1 and 5 : 1 in cascade with the binary stages. The progressive switching of such a frequency-dividing network results in pulse rates or repetition frequencies, occurring in either ascending or descending order, related to one another substantially in the proportion $1 : \sqrt{2} : 2 : 2\sqrt{2} : 4$, etc., which may also be expressed as $$2^{0/2} : 2^{1/2} : 2^{2/2} : 2^{3/2} : 2^{4/2} \text{ and so on.}$$

In the more general case, this relationship can be written as $2^{k/n}$ where $k$ is an integer starting with 0 and assuming progressively higher positive or negative values.

Advantageously, the pulse counter actuated by the frequency-dividing network is presettable to an initial digital reading deviating from 0 to an extent compensating from a residual error which results from the imperfect approximation of a logarithmic function by the described switching system. Such a presettable digital pulse counter may also be used with the second mode of operation referred to above, i.e., with the capacitor discharging to ground level, for delaying the start of the actual counting period beyond the beginning of the discharging interval in order to balance the effect of a reference voltage of finite magnitude applied to the control input of the operational amplifier during the discharge.

The above and other features of my invention will be described in detail with reference to the accompanying drawing in which.

Figure 1A:
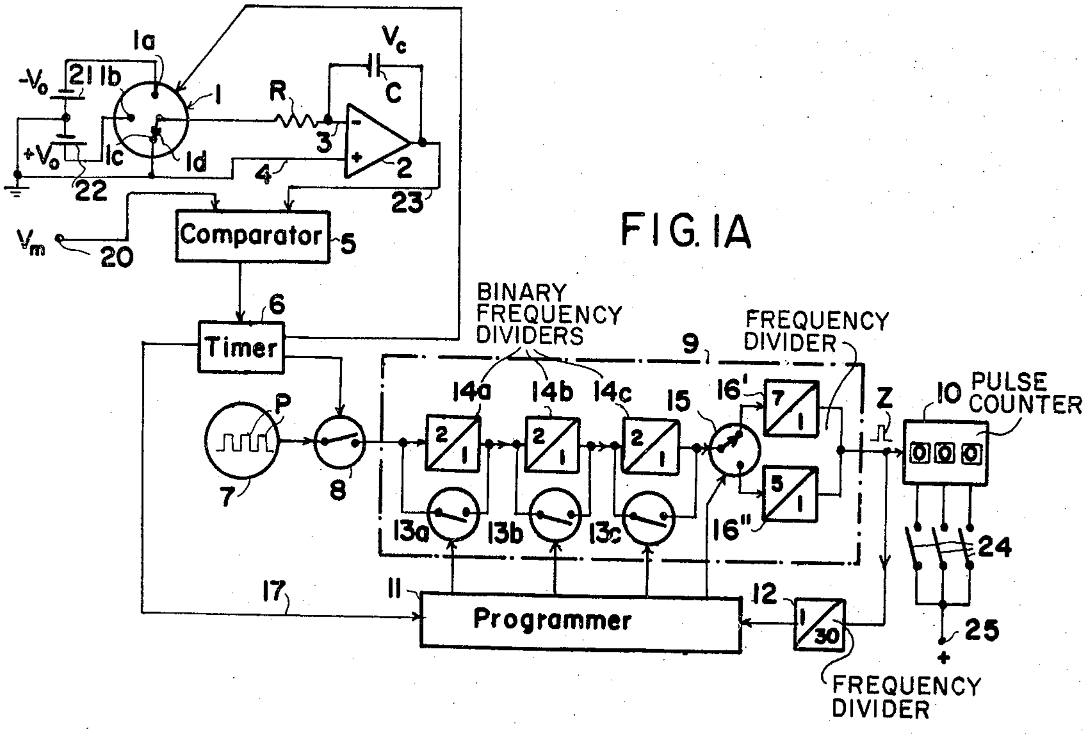
FIG. 1A is a circuit diagram of an indicating system embodying my invention.

In FIG. 1A I have shown a terminal 20 which carries the variable voltage $V_m$ to be measured. Two other terminals 1*a* and 1*b*, forming part of a switch 1, are connected to respective batteries 21 and 22 to receive a negative reference voltage $-V_0$ and a positive reference voltage $+V_0$ which may or may not be of the same absolute magnitude. Switch 1 also has a grounded further terminal 1*c* normally engaged by its wiper 1*d*. This wiper is connected through a resistor R to an inverting input 3 of an operational amplifier 2 whose noninverting input 4 is grounded. The output 23 of this amplifier is returned to input 3 by a feedback loop including a capacitor C whose charging voltage has been designated $V_c$.

The grounding of noninverting input 4 also maintains the inverting input 3 of amplifier 2 substantially at ground potential. With wiper 1*d* on bank contact 1*a* or 1*b*, therefore, resistor R is traversed by a constant current of magnitude $-V_o/R$ or $+V_o/R$, respectively. This constant input current results in the flow of a constant output current into or out of capacitor C which thus charges or discharges at a constant rate; these items are to be understood in a relative sense inasmuch as the capacitor, or discharging beyond zero voltage, will charge in the opposite sense. These phenomena, of course, occur only in the linear operating range of the transistors constituting the amplifier 2.

The output voltage of amplifier 2, which substantially equals the capacitor voltage $V_c$, is fed to an input of a voltage comparator 5 whose other input is tied to terminal 20. The charging of capacitor C is initiated at a time $t_a$ (FIG. 2) by a timer 6 which moves the wiper 1*d* of switch 1 from ground contact 1*c* to bank contact 1*a*, thereby driving the amplifier input 3 negative and generating a rising output voltage which after a predetermined charging interval, at a time $t_b$, develops a peak voltage $V_{max}$ across the capacitor. At the instant $t_b$ the timer 6, by switching over to the bank contact 1*b*, reverses the polarity of the driving voltage applied to resistor R so that capacitor C begins to discharge at a constant rate. At a time $t_x$, when the voltage $V_c$ has dropped to a level $V_x$ equaling the unknown voltage $V_m$, comparator 5 delivers to timer 6 a signal which marks the end of the discharge interval.

Figures 2, 3, 4, 5, 6:
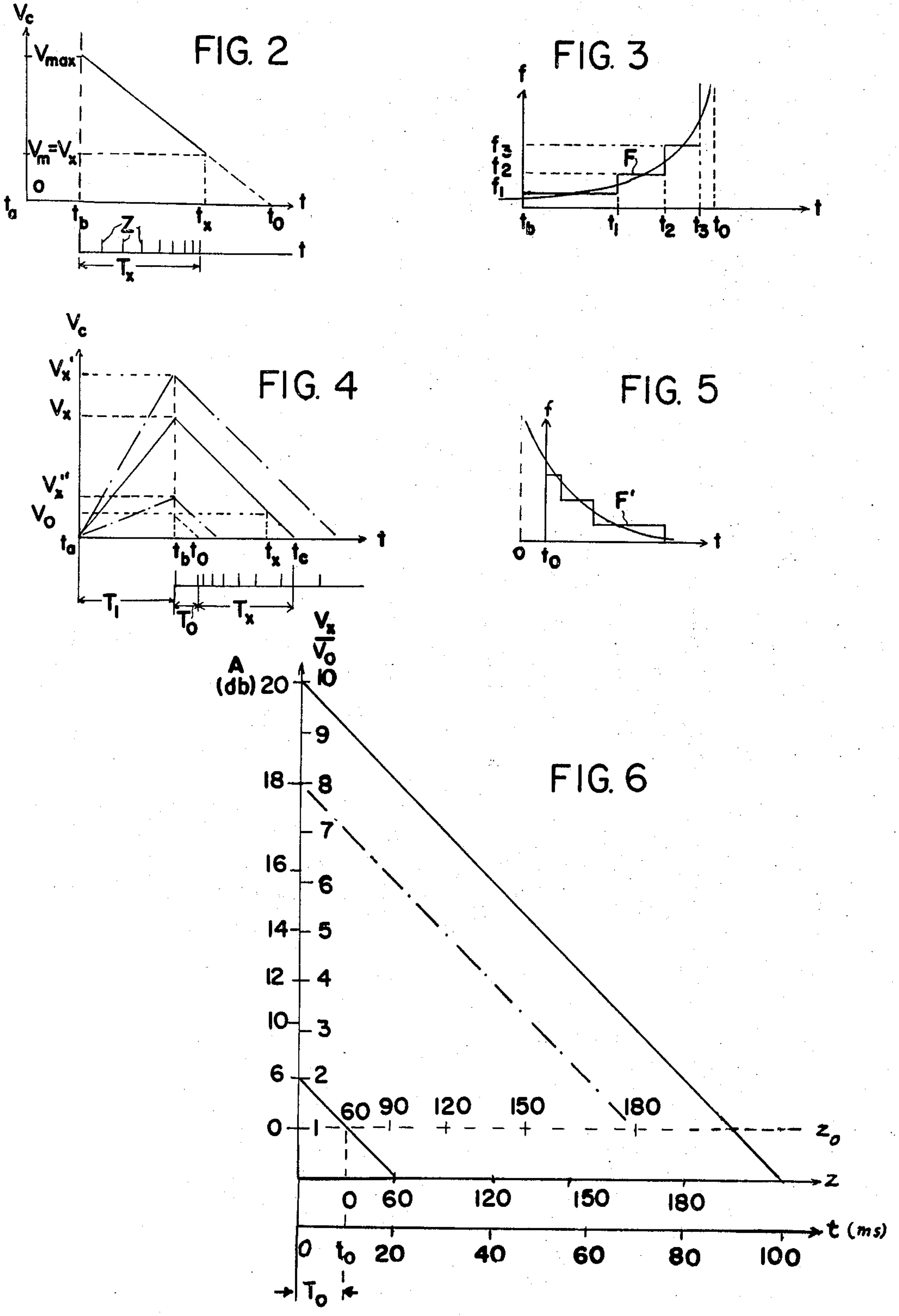
FIG. 2 is a graph illustrating the charging and discharging of a capacitor in the system of FIG. 1A.
FIG. 3 is a graph showing a stepped pulse frequency approximating a logarithmic function in the system of FIG. 1A.
FIGS. 4 and 5 are graphs similar to FIGS. 2 and 3, respectively, but relating to the system of FIG. 1B.
FIG. 6 is an enlargement of the discharge portion of the graph of FIG. 4 for a specific numerical example.

During this discharge interval, which has been designated $T_x$ in FIG. 2, a pulse generator 7 delivers a train of high-frequency pulses P of fixed cadence to a frequency-dividing network 9 through a gate 8 which is closed by the timer during this interval. Network 9 comprises several binary stages 14*a*, 14*b*, 14*c*, connected in cascade, each shunted by an individual bypass switch 13*a*, 13*b*, 13*c*, and two further divider stages 16' and 16'' of step-down ratios 7:1 and 5:1, respectively, these latter stages being alternatively connectable in the output of binary stage 14*c* by a switch 15.

The output of network 9, delivered by stage 16' or 16'', is fed to a digital counter 10 in the form of pulses Z recurring at a frequency $f$ which is determined by the position of switches 13*a*, 13*b*, 13*c* and 15; the several stages of counter 10 can be manually preset to an initial count other than zero, as explained above, with the aid of contacts 24 connected to a supply terminal 25.

Output pulses Z are also applied, via a further divider 12 of fixed step-down ratio 30:1, to a programmer 11 controlling the switches 13*a*, 13*b*, 13*c* and 15. Programmer 11 is started at instant $t_b$, by a signal from timer 6 received over a lead 17, and thereafter responds to every thirtieth pulse Z to increase the pulse frequency $f$ (as diagrammatically indicated in FIG. 2) in successive steps by increments of $2^{1/2}$ as described above. For this purpose, the programmer in a first step reverses the switch 15 so as to connect divider 16'' in circuit instead of divider 16'; in a second step, switch 15 is restored to its previous position but switch 13*a* is closed to short-circuit the binary stage 14*a*. Thereafter, switch 15 is again reversed and restored at a third and fourth step, the latter step including the closure of bypass switch 13*b*. If capacitor C has not yet discharged to comparison level $V_m$, switch 15 again alternates between stages 16'' and 16' in two further steps, the last of these steps coinciding with the closure of bypass switch 13*c*. Naturally, the number of these binary stages and bypass switches could be increased if necessary.

If the switch 1 remains in its last position (with wiper 1*d* on bank contact 1*b*) beyond the end of the discharge interval, capacitor voltage $V_c$ reaches zero (ground) at a time $t_o$. Comparator 5 may have a grounded further input in order to detect this condition and signal the timer 6 to return the wiper 1*d* to its normal position on bank contact 1*c*, thereby holding the capacitor C discharged.

FIG. 2 shows that $(V_x/V_{max}) = (t_o - t_x/t_o)$, whence $$V_m = V_x = V_{max}\ (1 - t_x/t_o) \quad (1)$$

or, as a logarithmic damping function, $$a_m \equiv -ln\ V_x/V_{max} = -\ ln(1 - t_x/t_o) \quad (2)$$

If $z$ is the number of pulses Z occurring during the interval $t_x$, and if this number is to be proportional to the logarithm of the analog value represented by voltage $V_m$, then $$z = -K \cdot ln(1 - t/t_o) \quad (3)$$

where $K$ is a constant and $t$ replaces $t_x$ in equation (2). If the successive pulses Z have numerical values $z_i$ and $z_{i+1}$, with $z_{i+1} - z_i = \Delta z = 1$, and if these pulses occur at times $t_i$ and $t_{i+1}$ with $t_{i+1} - t_i = 1/f = \Delta t$, then $\Delta z/\Delta t$ represents the change in pulse frequency $f$ with time $t$ during the discharging interval. In the limiting case in which $f \rightarrow \infty$, we can replace $\Delta z/\Delta t$ by $dz/dt$ which, from equation (3), is given by $$dz/dt = K/t_o \cdot t_o/t - t_o \quad (4)$$

In the actual case, with substitution of $\Delta z/\Delta t$ for $dz/dt$, we can write $$\Delta z/\Delta t = 1/\Delta t = f = -K/t-t_o \quad (5)$$

Equation (5) is a hyperbolic function $f(t)$ as illustrated in FIG. 3, this function having an asymptote at $t = t_o$; the hyperbola can be approximated by a stepped curve $F$ divided at times $t_1$, $t_2$, $t_3$, etc., into segments of constant frequencies $f_1, f_2, f_3$, etc. The instants $t_1$, $t_2$, $t_3$ are those in which the programmer 11 closes the switches 13*a*, 13*b*, 13*c* in FIG. 1A. Intermediate steps, not illustrated in FIG. 3, are obtained by the aforedescribed operation of switch 15 between these instants.

Figure 1B:
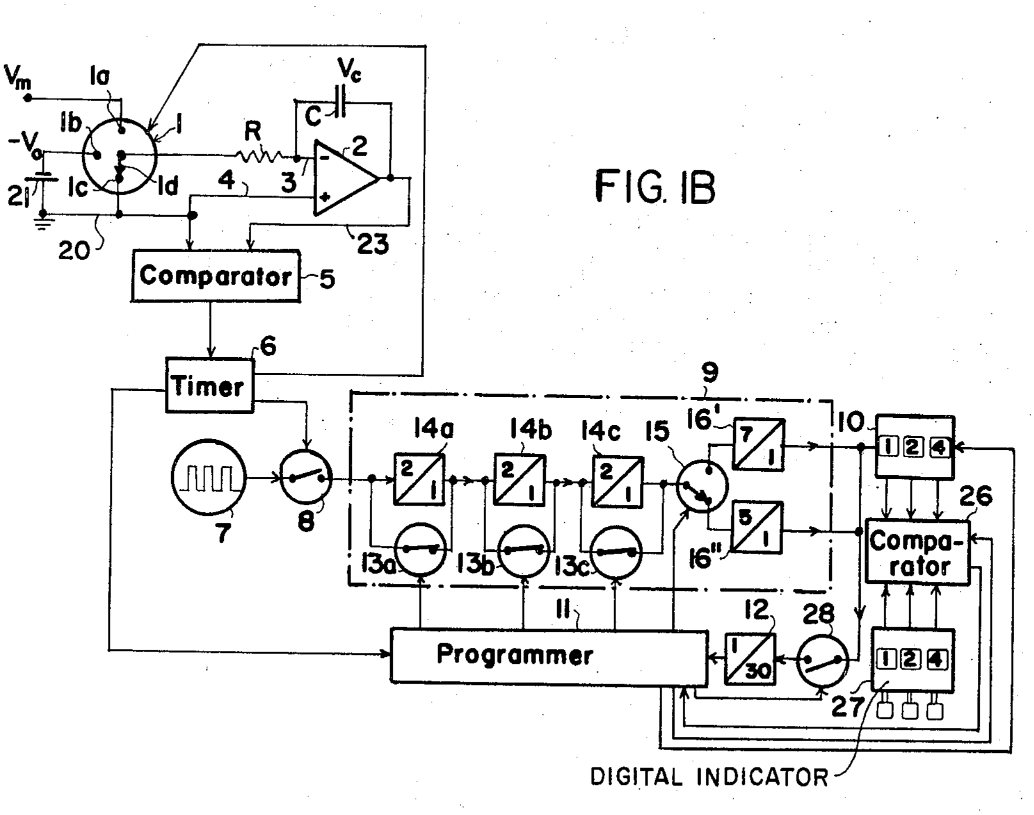
FIG. 1B is a diagram similar to FIG. 1B, showing a modification.

The embodiment of FIG. 1B differs from that of FIG. 1A in that battery 22 has been omitted, the reference input 20 of comparator 5 has been grounded and analog voltage $V_m$ is applied to bank contact 1*a* of switch 1 whose bank contact 1*b* is connected to negative potential delivered by battery 21. Also, the switches 13*a*, 13*b*, 13*c* are all closed in the initial position in which wiper 1*d* stands on the grounded bank contact 1*c*, switch 15 being connected to divider 16'' at this point. Other, optional features shown in FIG. 1B include a digital comparator 26 connected to counter 10 and to a similar manually presettable digital indicator 27, this comparator controlling the programmer 11 as described below, and a gate 28 in series with frequency divider 12.

In the operation of the system of FIG. 1B, wiper 1*d* of switch 1 is moved onto bank contact 1*a* at time $t_a$ (FIG. 4) so that capacitor C charges at a rate determined by the variable voltage $V_m$ during an interval $T_1$ of fixed duration (e.g. 20 ms), this interval terminating at instant $t_b$ with a switchover to bank contact 1*b* and negative control voltage $-V_o$. At the time $t_b$ the capacitor voltage $V_c$ has reached a peak value $V_x$ which is proportional to the analog voltage $V_m$ controlling a charging of the capacitor; this peak value will therefore be different, as indicated at $V_x'$ and $V_x''$, for other values of voltage $V_m$.

At the beginning of the capacitor discharge, which occurs at a predetermined rate under the control of fixed reference voltage $-V_o$, timer 6 holds the gate 8 open to delay the start of the measuring period $T_x$ by an interval $T_o$ representing the time required for the capacitor C to reduce its charge by an amount equal to $V_o$. With $V_m$ supposed to be positive, the capacitor voltage actually assumes negative values in comparison with the situation depicted in FIG. 2, though this has not been illustrated in FIG. 4. The delay interval $T_o$ provides a fixed reference parameter for measuring the discharge period $T_x$; the length of this period equals the time $t_x-t_b$ in FIG. 4 and is also equal to $t_c-t_o$, the time $t_o$ again denoting the instant when the capacitor C discharges to ground level. Thus, we obtain from FIG. 4 a relationship similar to that of equation (1), namely $$V_x = V_o\ (1 + t_x/t_o) \quad (1')$$

whence $$a_m = 1n\ V_x/V_o = 1n(1 + t_x/t_o) \quad (2').$$

For the pulse count $z$ we obtain $$z = K\cdot 1n(1 + t_x/t_o) \quad (3')$$

and $$dz/dt = k/t_o \cdot t_o/t_x+t_o \quad (4')$$

whence $$f = K/t_x+t_o \quad (5');$$

with $t = t_x+t_o$ representing the elapsed time starting at the instant $t_b$, we obtain $$z = K\cdot 1nt/t_o \quad (3'')$$

and $$f = K/t \quad (5'').$$

This function is again a hyperbola, as illustrated in FIG. 5, which can be approximated by a stepped curve F' representing generally a mirror image of the curve F of FIG. 3. Curve F' is again subdivided into linear segments by the operation of programmer 11 which in FIG. 1B successively opens the switches 13*a*, 13*b* and 13*c*; the intermediate steps, not illustrated in this Figure, are again performed by reversals of switch 15 which initially connects the divider stage 16'' to stage 14*c* by way of gate 15.

Timer 6 of FIG. 1B need not delay the opening of gate 8 to the end of period $T_o$ if, as illustrated, indicator 27 is preset to a numerical value representing the duration of this delay interval. As soon as comparator 26 determines the equality of the readings of indicators 10 and 27, it signals the programmer 11 which thereupon causes the closure of the previously open gate 28 and also resets the counter 10 to zero.

FIG. 6 represents a numerical example for the voltage ratio $V_x/V_o$ and the corresponding logarithmic reading A (in decibels) as given by the equation $$A = 20\ log\ V_x/V_o \quad (6).$$

This diagram assumes that, with gate 8 of FIG. 1*b* closed at time $t_b$, counter 10 is preset to a negative reading corresponding to the number of pulses Z passing the network 9 in the delay interval $T_o$. Thus, counter 10 has a reading of zero at time $T_o$, comparator 26 being set in this case to detect this zero count in order to bring about the closure of gate 28. In this particular example, the number of pulses Z during interval $T_o$ is 60. With a discharge time of 90ms assumed for an energy level A of 20dB, interval $T_o$ is found to measure 10ms, this being the time in which the ratio $V_x/V_o$ decays from 1 to 0. The increments of magnitude 1 along the ordinate axis of FIG. 6 correspond substantially to 6dB so that, with 60 counting pulses available, the system has the resolution of $A = 0.1$dB.

If it is desired to change the threshold $A = 0$ without modifying the reference voltage $V_o$, it is merely necessary to vary the presetting of counter 10 in the opposite sense. Thus, a zero reading for $V_x/V_o = 4$ instead of $V_x/V_o = 1$ can be obtained by setting the counter 10 to an initial count of $-120$; this corresponds to a damping factor of 12dB so that, again, the initial pulse rate allows a resolution of 0.1dB. With $V_o = 1$ volt and a capacitor voltage $V_c = V_x$ of 8 volts, the total pulse count $z_o$ is then 180 so that $z = 60$ which corresponds to a reading A of 6dB.

The principles herein disclosed could also be applied to systems for measuring variable currents instead of voltages, with an inductance coil substituted for the capacitor C; the measuring period then terminates when the current through the coil either decays from a predetermined initial value to the level of the current to be measured or from a value proportional to the latter current to zero level.

I claim:

1. A system for logarithmically indicating an analog value expressed by a variable voltage, comprising:

a capacitor;

circuit means for reversibly charging said capacitor with constant current, said circuit means being provided with input means energizable to control the direction of current flow into said capacitor whereby the latter can be alternately charged and discharged at constant rates;

a voltage comparator having a first input connected to said capacitor and provided with a second input for establishing a level of comparison with the charge of said capacitor;

three terminals respectively carrying a first predetermined voltage, a second predetermined voltage and said variable voltage;

switch means for connecting said input means to one of said terminals during a charging interval and to another of said terminals during a discharging interval, the remaining terminal being connected to said second input;

timer means connected to said switch means and to said voltage comparator for establishing a measuring period between the beginning of said discharging interval and the arrival of the capacitor charge at said level of comparison, said measuring period having a duration proportional to the instantaneous magnitude of said variable voltage;

a generator of pulses of constant cadence enabled by said timer means during said measuring period;

counting means for said pulses connected to said generator;

adjustable frequency-dividing means inserted between said generator and said counting means for stepping down said cadence to a variable pulse rate; and programming means responsive to a predetermined pulse count in the output of said frequency-dividing means for progressively modifying the step-down ratio thereof by a substantially constant factor of $a^{1/n}$, n being a finite integer, in a number of steps sufficient to approximate a logarithmic relationship between the magnitude of said variable voltage and the total number of pulses counted during said measuring period.

2. A system as defined in claim 1 wherein $n = 2$.

3. A system as defined in claim 1 wherein said frequency-dividing means comprises a plurality of cascaded binary dividers and bypass switches controlled by said programming means for individually short-circuiting any of said dividers.

4. A system as defined in claim 3 wherein said frequency-dividing means further comprises two final dividers having step-down ratios of 5 : 1 and 7 : 1, respectively, said programming means alternately connecting said final dividers in cascade with said binary dividers between reversals of any of said bypass switches.

5. A system as defined in claim 1 wherein said circuit means comprises an operational amplifier having said capacitor connected in a feedback loop thereof.

6. A system as defined in claim 5 wherein said operational amplifier has a grounded noninverting input and an inverting input included in said feedback loop, said inverting input being connected through a resistor to said switch means.

7. A system as defined in claim 6, further comprising a grounded fourth terminal connectable to said inverting input by said switch means prior to said charging interval.

8. A system as defined in claim 7 wherein said one of said terminals carries a fixed voltage of one polarity, said other of said terminals carrying a fixed voltage of the opposite polarity, said remaining terminal carrying said variable voltage.

9. A system as defined in claim 7 wherein said one of said terminals carries said variable voltage, said other of said terminals carrying a fixed voltage, said remaining terminal being grounded.

10. A system as defined in claim 1 wherein said counting means comprises a digital counter presettable to a value other than zero.

* * * * *